(12) United States Patent
Salaheddine et al.

(10) Patent No.: US 9,408,366 B2
(45) Date of Patent: Aug. 9, 2016

(54) MILKING DEVICE

(75) Inventors: Mourad Salaheddine, Schoonhoven (NL); Marc Peter Elvira Maria Klyutmans, Asten (NL); Pieter Cornelis Johannes Maria Streng, Lopik (NL)

(73) Assignee: PHARMING INTELLECTUAL PROPERTY BV (NL)

( * ) Notice: Subject to any disclaimer, the term of this patent is extended or adjusted under 35 U.S.C. 154(b) by 277 days.

(21) Appl. No.: 13/980,283

(22) PCT Filed: Jan. 19, 2012

(86) PCT No.: PCT/NL2012/050030
§ 371 (c)(1),
(2), (4) Date: Sep. 30, 2013

(87) PCT Pub. No.: WO2012/099470
PCT Pub. Date: Jul. 26, 2012

(65) Prior Publication Data
US 2014/0373786 A1 Dec. 25, 2014

Related U.S. Application Data

(60) Provisional application No. 61/434,939, filed on Jan. 21, 2011.

(30) Foreign Application Priority Data

Jan. 21, 2011 (NL) ..................................... 2006046

(51) Int. Cl.
*A01J 5/04* (2006.01)
*A01J 9/00* (2006.01)

(52) U.S. Cl.
CPC .. *A01J 5/047* (2013.01); *A01J 5/04* (2013.01); *A01J 5/041* (2013.01); *A01J 5/044* (2013.01); *A01J 9/00* (2013.01)

(58) Field of Classification Search
CPC ............... A01J 5/00; A01J 5/04; A01J 5/041; A01J 5/042; A01J 5/044; A01J 5/047; A01J 5/10
USPC .......... 119/14.01, 14.02, 14.24, 14.25, 14.27, 119/14.29, 14.3, 14.32, 14.34, 14.35, 14.36, 119/14.37, 14.43, 14.46, 14.54, 14.55
IPC ........................................ A01J 5/00, 5/04, 5/10
See application file for complete search history.

(56) References Cited

U.S. PATENT DOCUMENTS 2,887,986 A    5/1956 Golemon
2,836,148 A *  5/1958 Eades ........................ 119/14.08
(Continued)

FOREIGN PATENT DOCUMENTS

CN    2340184 Y    9/1999
CN    1241008 C    12/2000
(Continued)

OTHER PUBLICATIONS

C. T. Rodgers, "Practical aspects of milk collection in the rat" Laboratory Animals (1995) 29, 450-455.*
(Continued)

*Primary Examiner* — Lisa Tsang
(74) *Attorney, Agent, or Firm* — Alston & Bird LLP

(57) ABSTRACT

A milking device includes a vessel and cover plate. The vessel and the cover plate form a sealed volume that is internally divided into a collecting chamber, a vacuum chamber and an air intake chamber. The collecting chamber is arranged between the vacuum chamber and the air intake chamber. The vessel has a first internal wall that separates the collecting chamber from the air intake chamber, with a first passage between the collecting chamber and the air intake chamber arranged at the first internal wall. The vessel has a second internal wall that separates the collecting chamber from the vacuum chamber, with a second passage between the collecting chamber and the vacuum chamber arranged at the second internal wall.

17 Claims, 6 Drawing Sheets

(56) References Cited

U.S. PATENT DOCUMENTS

| | | | |
|---|---|---|---|
| 3,150,637 A * | 9/1964 | Fosnes | 119/14.54 |
| 3,185,132 A | 5/1965 | Allard | |
| 3,580,220 A * | 5/1971 | Cook et al. | 119/14.01 |
| 3,726,253 A * | 4/1973 | Duncan | 119/14.18 |
| 3,741,161 A * | 6/1973 | Zhuk et al. | 119/14.36 |
| 4,395,971 A * | 8/1983 | Happel et al. | 119/14.36 |
| 4,574,736 A * | 3/1986 | Tanaka et al. | 119/14.08 |
| 4,957,065 A * | 9/1990 | Neff et al. | 119/14.37 |
| 6,814,028 B2 | 11/2004 | Watanabe | |
| 8,146,532 B2 | 4/2012 | Watanabe | |
| 8,438,992 B2 | 5/2013 | Auburger | |
| 2014/0373786 A1 | 12/2014 | Salaheddine | |

FOREIGN PATENT DOCUMENTS

| | | | |
|---|---|---|---|
| CN | 1382970 A | 12/2002 | |
| CN | 201084957 Y | 7/2008 | |
| CN | 101448392 A | 6/2009 | |
| CN | 101932230 A | 12/2010 | |
| EP | 1254595 B1 | 4/2011 | |
| GB | 2191076 A * | 12/1987 | A01J 7/00 |
| GB | 2376167 A | 12/2002 | |
| GB | 2450036 A | 12/2008 | |
| WO | WO 2007129888 A1 * | 11/2007 | A01J 5/04 |

OTHER PUBLICATIONS

CN Application No. 201280009744.9, First Office Action dated May 7, 2014.

Nelson et al., "Milking Techniques and the Composition of Guinea Pig Milk," The Journal of Nutrition, 44:585-594, (1951).

Temple et al., "A Simple Apparatus for Milking Small Laboratory Animals," Biochemical Journal, 31:2197-2198, (1937).

WIPO Application No. PCT/NL2012/050030, International Preliminary Report on Patentability, issued Jul. 23, 2013.

WIPO Application No. PCT/NL2012/050030, International Search Report, mailed Mar. 5, 2012.

WIPO Application No. PCT/NL2012/050030, Written Opinion of the International Searching Authority, mailed Mar. 5, 2012.

* cited by examiner

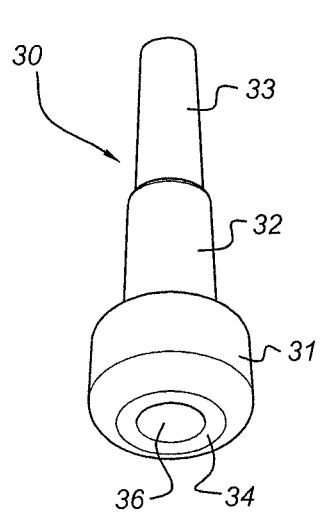
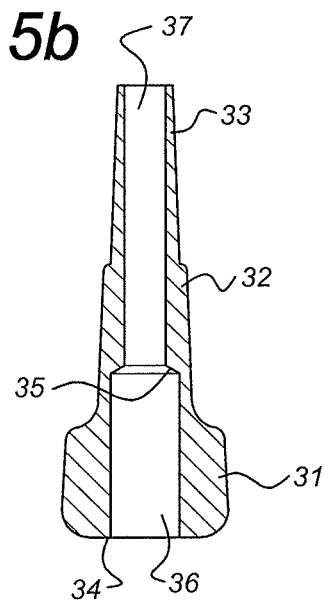
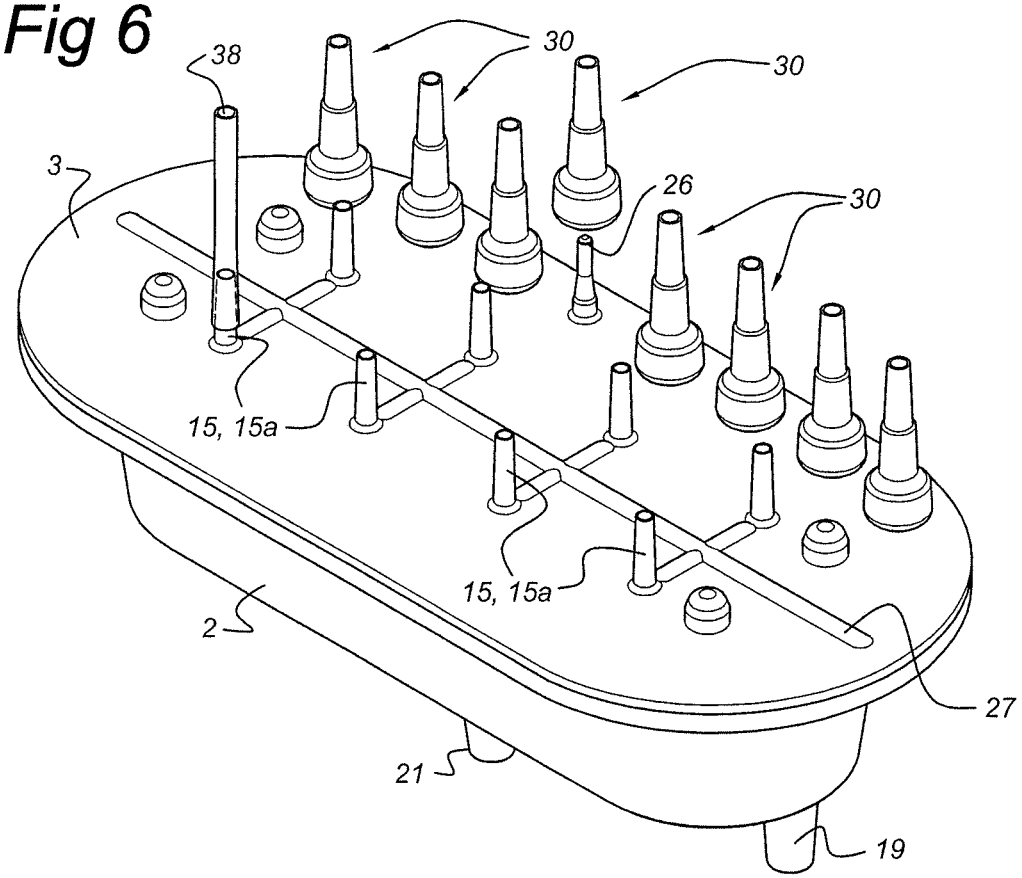

MILKING DEVICE

CROSS-REFERENCES TO RELATED APPLICATIONS

This application is the US national stage of PCT/NL2012/050030 filed Jan. 19, 2012, which claims the benefit of US Provisional Application No. 61/434,939, filed Jan. 21, 2011 and Netherlands Patent Application No. 2006046, filed Jan. 21, 2011.

FIELD

The present invention relates to a milking device for rabbits. Also, the present invention relates to a method of manufacturing such a milking device. Moreover, the present invention relates to a milking installation comprising such a milking device. Furthermore, the present invention relates to a use of the milking device.

BACKGROUND

In biotechnology there is an on-going development to create genetically engineered animals for the production of human (compatible) substances such as proteins that can be used in treatment of human diseases. A recent example is the development of genetically engineered rabbits that produce the so-called C1 inhibitor protein in their milk.

To obtain such proteins or other substances from rabbit milk, lactating rabbits are to be milked mechanically on a daily basis, more or less in a similar way as other milk producing species such as cows and goats. Milking devices from the prior art generally consist of a metal (preferably stainless steel) manifold coupled to teat cups by means of conduits. In such milking devices, the manifold is further connected to a vacuum buffer for pumping milk from the manifold by use of a vacuum flow. In the vacuum buffer the milk is separated from the vacuum flow.

The milking devices made from metal have some shortcomings that relate to the processing of the milk. Separation of the milk in the vacuum buffer can adversely affect the quality of the milk. Additionally, the milking devices made from metal require strict cleaning to comply with official hygienic regulations relating to the production of medical substances. In respect to milking rabbits with a former used stainless steel milking device, the manifold has channels that are designed to be small in order to obtain a better flow of milk and provide a stable vacuum. However such a manifold with tiny channels is difficult to clean as dried milk deposits often settle in the channels which deposits are not easily removed. These deposits can be a source of huge bio burden bursts in the milk during subsequent milking(s). Furthermore validating the cleaning process is problematic as it is difficult to obtain samples for microbiological culture from the manifold channels.

It is an objective of the present invention to provide a milking device in which the shortcomings from the prior art are removed or mitigated, and the bio burden is reduced down to approximately zero levels.

SUMMARY

The present invention relates to a milking device comprising a vessel and cover plate;
the vessel and the cover plate forming a sealed volume; the sealed volume being internally divided into a collecting chamber, a vacuum chamber and an air intake chamber; the collecting chamber being arranged between the vacuum chamber and the air intake chamber; the vessel having a first internal wall that separates the collecting chamber from the air intake chamber, a first passage between the collecting chamber and the air intake chamber being arranged at the first internal wall; the vessel having a second internal wall that separates the collecting chamber from the vacuum chamber, a second passage between the collecting chamber and the vacuum chamber being arranged at the second internal wall.

Advantageously, the milking device provides an improved separation of the milk from the vacuum. Moreover, the device according to the present invention has been especially designed to separate the obtained milk from the vacuum in a way that prevents formation of froth which would otherwise build up and bring milk into the vacuum line thereby causing contamination of that vacuum line. The separation is described intra.

According to an embodiment, the present invention relates to the milking device as described above, wherein the first passage is arranged between the first internal wall and an internal surface of the cover plate, and the second passage is arranged between the second internal wall and an internal surface of the cover plate.

According to an embodiment, the present invention relates to the milking device as described above, wherein the milking device comprises a partition wall which extends from a top portion of the second internal wall at the side of the vacuum chamber to a bottom portion of the first internal wall at the side of the air intake chamber and which separates the collecting chamber in a lower collecting chamber portion and an upper collecting chamber portion.

According to an embodiment, the present invention relates to the milking device as described above, wherein the cover plate comprises a plurality of conduits which protrude from an outer surface of the cover plate and extend through the cover plate into the collecting chamber; an outlet portion of each conduit being adjacent to a bottom surface of the collecting chamber; and wherein the partition wall comprises a plurality of openings on which tubings are arranged, the number of tubings corresponds to the number of conduits; the tubings extending from the partition wall to the cover plate in such a way that each opening and tubing of the partition wall is arranged with a internal diameter and a position on the partition wall to allow passage of the corresponding conduit of the cover plate through the partition wall into the lower collecting chamber portion.

According to an embodiment, the present invention relates to the milking device as described above, wherein a perimeter surface of an upper edge of the vessel is arranged with a widened contacting surface and the cover plate is arranged with a secondary widened contacting surface in such a way that the widened contacting surface of the vessel contacts the secondary widened contacting surface of the cover plate.

According to an embodiment, the present invention relates to the milking device as described above, wherein an outer surface of the cover plate comprises outward extensions of the conduits, arranged for connection to a flexible tube of which a distal end can be equipped with a teat cup.

According to an embodiment, the present invention relates to the milking device as described above, wherein the outer surface of the cover plate comprises a series of posts that are each shaped to receive the opening of one teat cup, each post serving as a support for the teat cup.

According to an embodiment, the present invention relates to the milking device as described above, wherein the cover plate comprises on its inner surface a first edge and a second edge, the first edge being arranged at a location between the first passage in the first internal wall and the collecting chamber, the second edge being arranged at a location corresponding between the second passage in the second internal wall and the collecting chamber.

According to an embodiment, the present invention relates to the milking device as described above, wherein the collecting chamber has an outlet for fluid, the air inlet chamber has an air inlet, and the vacuum chamber has an vacuum outlet.

According to an embodiment, the present invention relates to the milking device as described above, wherein any one of the vessel, the cover plate, and partition wall is manufactured from a plastic.

Moreover, the present invention relates to a milking installation comprising a milking device as described above, a vacuum pump, a roller pump and an air inlet device, an inlet of the vacuum pump being connected over a conduit with the vacuum outlet of the vacuum chamber, an inlet of the roller pump being connected over a conduit with the outlet for fluid of the collecting chamber, a valve of the air inlet device being connected to the air inlet of the air inlet chamber.

According to an embodiment, the present invention relates to the milking installation as described above, wherein an outlet of the roller pump is in fluid communication with a container for collecting fluid from the collecting chamber.

According to an embodiment, the present invention relates to the milking installation as described above, wherein the valve of the air inlet device is configured to provide an, in alternation, opened and closed aperture for inlet of air or a gas such as nitrogen, into the air inlet chamber.

According to an embodiment, the present invention relates to the milking installation as described above, further comprising a number of teat cups each connected by a respective flexible tube to one of the conduits of the cover plate. Also, the present invention relates to a method of manufacturing a milking device as described above, comprising a casting or injection moulding of the vessel, the cover plate and the partition wall from a plastic.

According to an embodiment, the present invention relates to the method as described above, comprising inserting the partition wall into the collecting chamber of the vessel; positioning the cover plate on the vessel in such a way that the widened contacting surface of the vessel contacts the secondary widened contacting surface of the cover plate.

According to an embodiment, the present invention relates to the method as described above, wherein the widened contacting surface of the vessel and the secondary widened contacting surface of the cover plate are sealed together by a welding technique.

Furthermore, the present invention relates to a use of a milking device as described above, for milking animal species of the order Lagomorpha, in particular a rabbit and/or a hare, more in particular a genetically engineered rabbit.

Advantageous embodiments are further defined by the dependent claims.

BRIEF DESCRIPTION OF DRAWINGS

Below, the invention will be explained with reference to some drawings, which are intended for illustration purposes only and not to limit the scope of protection as defined in the accompanying claims.

In the drawings,

FIG. 5 shows a perspective view of a teat cup of the milking device, and

FIG. 6 shows a perspective view of the milking device, and

In the figures, the same reference numerals refer to similar or identical components or entities.

DETAILED DESCRIPTION

Figure 1A:
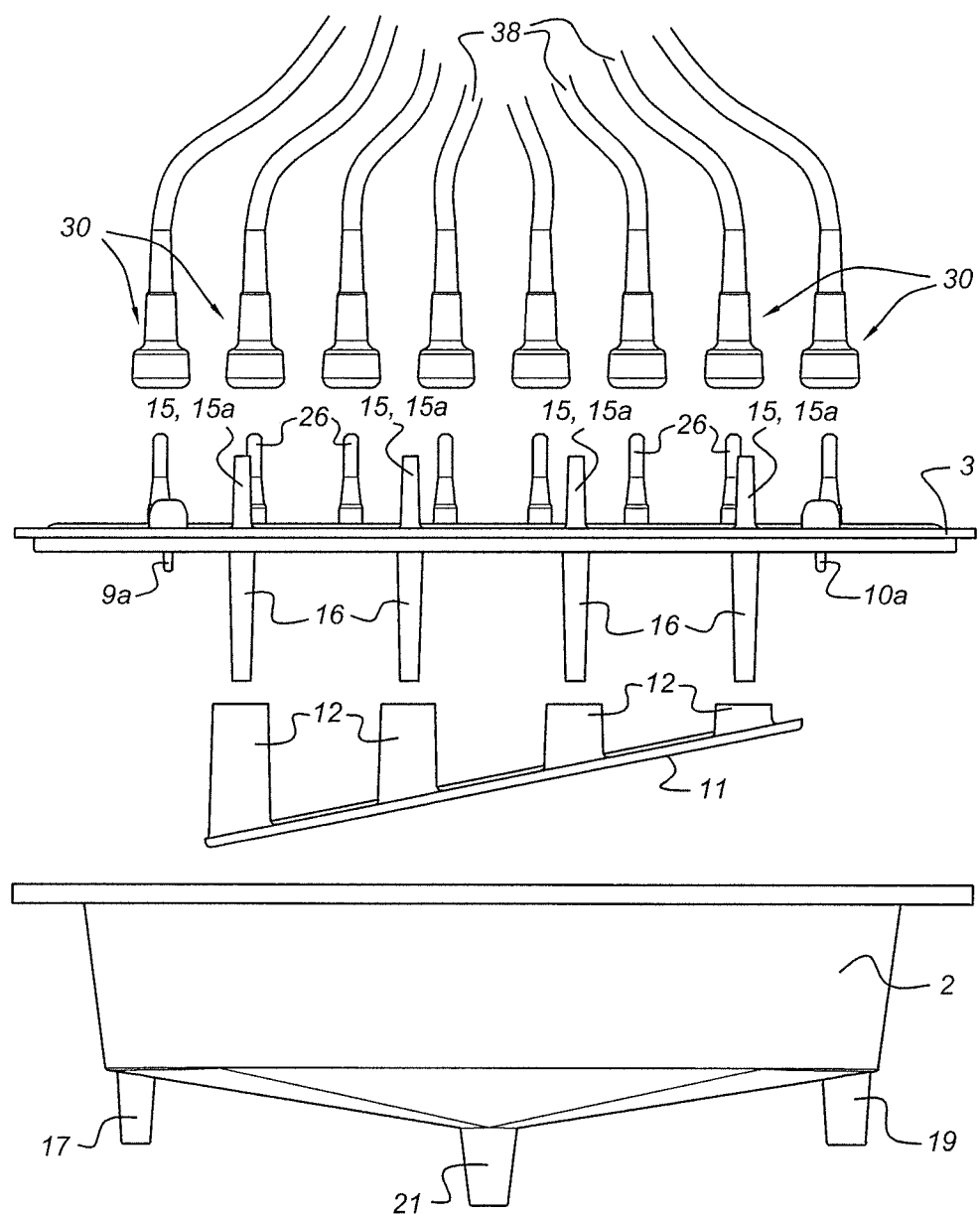
FIGS. 1a and 1b show a longitudinal cross-section of a milking device in an exploded view and an assembled view, respectively.
Figure 1B:
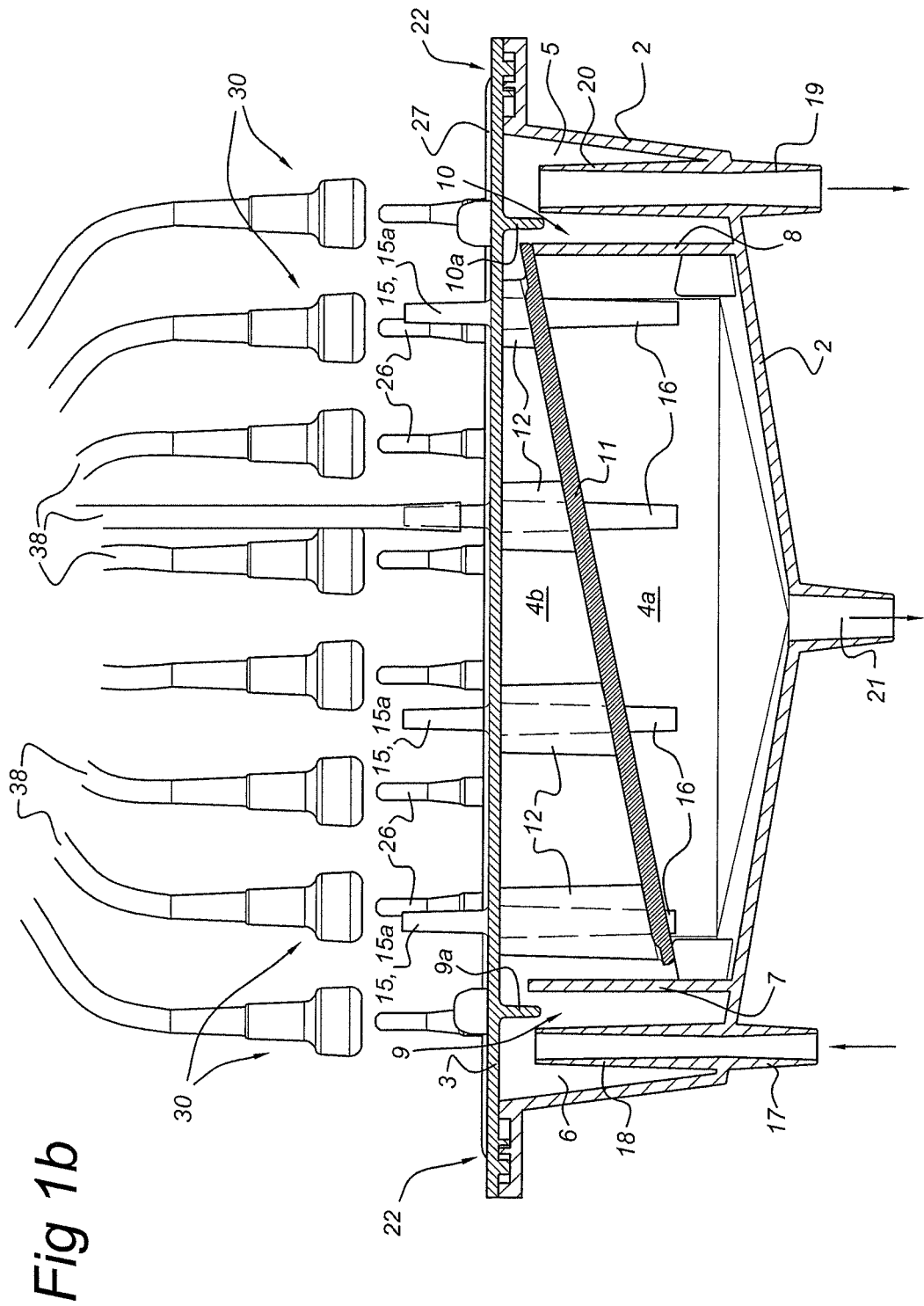

FIGS. 1a and 1b shows a longitudinal cross-section of a milking device according to an embodiment of the present invention, in an exploded and assembled view respectively.

The milking device 1 is a container which comprises a vessel 2 and a cover plate 3. The vessel 2 is formed as a volume defined by outer side walls 2a and a bottom wall 2b, wherein the outer side walls 2a are joined to the perimeter of the bottom wall 2b.

The cover plate 3 is arranged on and attached to the vessel 2 in such a way that a sealed volume is formed.

The volume of the vessel 2 is internally divided into a collecting chamber 4, a vacuum chamber 5 and an air intake chamber 6.

The collecting chamber 4 is separated from the air intake chamber 6 by a first internal wall 7. The collecting chamber 4 and the air intake chamber 6 are in communication through a first passage 9 which is arranged between the first internal wall 7 and the surface of the cover.

Further, the collecting chamber 4 is separated from the vacuum chamber 5 by a second internal wall 8. The collecting chamber 4 and the vacuum chamber 5 are in communication through a second passage 10 which is arranged between the second internal wall 8 and the surface of the cover.

Within the vessel 2, the collecting chamber 4 is arranged in between the air intake chamber 6 and the vacuum chamber 5, in such a way that in use, when a vacuum is maintained in the vacuum chamber, a flow of air from the air intake chamber passes the collecting chamber before arriving in the vacuum chamber.

By arranging the chambers of the milking device in this manner, the separation of milk from the flow of air towards the vacuum chamber is enhanced. In an embodiment, the air intake chamber may be arranged for producing a flow of air that is pulsating so as to provide a pulsating pressure variation in the milking device which enhances the secretion of milk from the animal.

In an embodiment, within the first passage 9, a first edge 9A is arranged on the inner surface of the cover plate 3 as a guide and/or constriction for the air flow from the air intake chamber to the collecting chamber, and within the second passage 10, a second edge 10A is arranged on the inner surface of the cover plate 3 as a guide and/or constriction for the air flow from the collecting chamber to the vacuum chamber.

The cover plate 3 comprises a plurality of conduits 15 which protrude from the outer surface of the cover plate 3 and extend through the cover plate 3 into the collecting chamber 4. An outlet portion 16 of each conduit 15 is arranged adjacent to the bottom surface of the collecting chamber 4. Each of the conduits 15 is coupled to a teat cup 30 by a flexible tube 38. For reason of clarity, the coupling of the conduit 15 to its corresponding flexible tube 38 is only shown in figure 1b. (also see FIGS. 6 and 7).

The collecting chamber 4 comprises a partition wall 11 which extends from a top portion of the second internal wall 8 at the side of the vacuum chamber 5 to a bottom portion of the first internal wall 7 at the side of the air intake chamber 6. The partition wall 11 separates the collecting chamber 4 in a lower collecting chamber portion 4A and an upper collecting chamber portion 4B. This partition of the collecting chamber 4 insures separation of milk from the flow of air while preventing build-up of froth towards the vacuum line.

The partition wall 11 comprises a plurality of openings on which tubings 12 are arranged. The tubings 12 extend from the partition wall to the cover plate 3. The number of tubings 12 corresponds to the number of conduits 15. Each opening and tubing of the partition wall is arranged with an internal diameter and a position on the partition wall to allow passage of the corresponding conduit through the partition wall into the lower collecting chamber portion.

The collecting chamber 4 comprises an outlet 21 for fluid in the lower portion 4A.

The air intake chamber 6 comprises an air inlet 17 for inlet of air. In an embodiment, the air-inlet comprises an inner air tube 18, which extends into the air intake chamber 6 towards the cover plate 3. The vacuum chamber 5 has a vacuum outlet 19. In an embodiment, the vacuum outlet 19 comprises an inner vacuum tube 20, which extends into the vacuum chamber 5 towards the cover plate 3.

Figure 2:
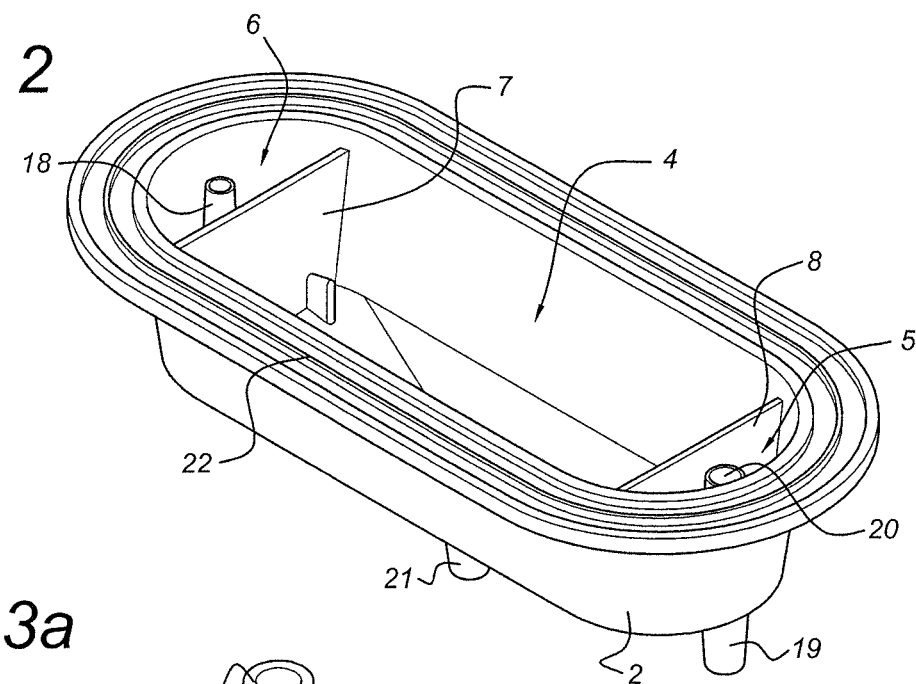
FIG. 2 shows a perspective view of the vessel of the milking device.

FIG. 2 shows a perspective view of the vessel of the milking device.

In an embodiment, the vessel 2 has an elongated shape with rounded end sections in which the vacuum chamber 5 and air intake chamber 6 are positioned at a respective end portion.

A perimeter surface of an upper edge of the vessel 2 is arranged with a widened contacting surface 22 for connection with the cover plate 3. The widened contacting surface 22 may have a profile which mates with a profile on a perimeter surface of the cover plate 3 (not shown).

Figure 3A:
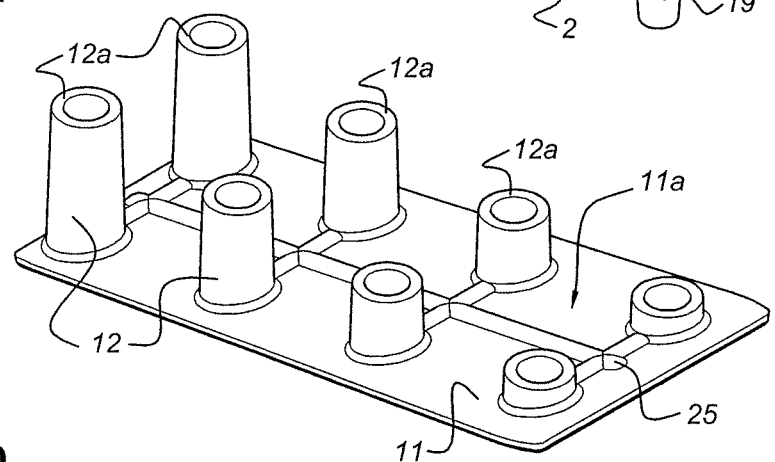
FIG. 3 shows a perspective view of the partition of the milking device.
Figure 3B:
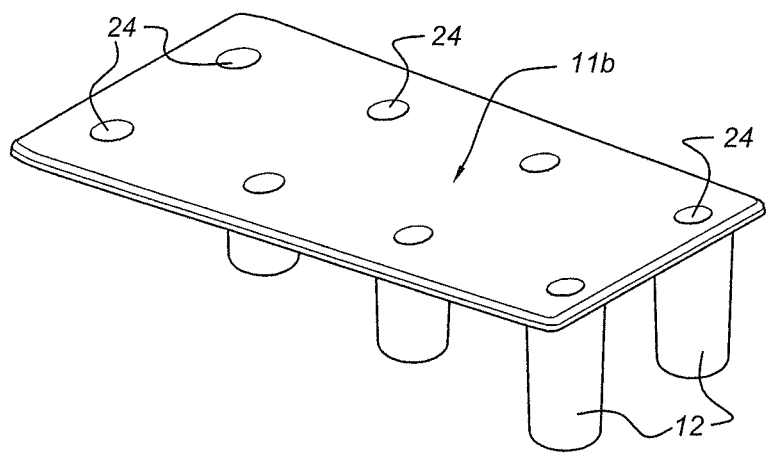

FIGS. 3A and 3B shows a perspective view of the partition wall of the milking device of an upper surface 11A and a lower surface 11B, respectively.

The partition wall 11 of the milking device 1 consists of a plate which can be positioned in the collecting chamber 4 of the milking device.

In an embodiment, the partition wall is positioned in a detachable manner within the collecting chamber 4.

The plate of the partition wall comprises a plurality of openings 24, of which the locations correspond with the locations of the conduits 15 in the cover plate 3 (not shown). At the upper surface of the partition wall 11, the tubings 12 are arranged at the location of the openings 24. The length of each tubing is related to the orientation of the partition wall in its position within the collecting chamber 4. Each tubing has such a length that a free end 12A of the tubing 12 extends to the level of the inner surface of the cover plate 3, when the cover plate is arranged on the vessel 2.

The length of the tubings 12 varies lengthwise along the partition wall 11, since the partition wall is positioned in the collecting chamber 4 under a sloping angle.

Figure 4A:
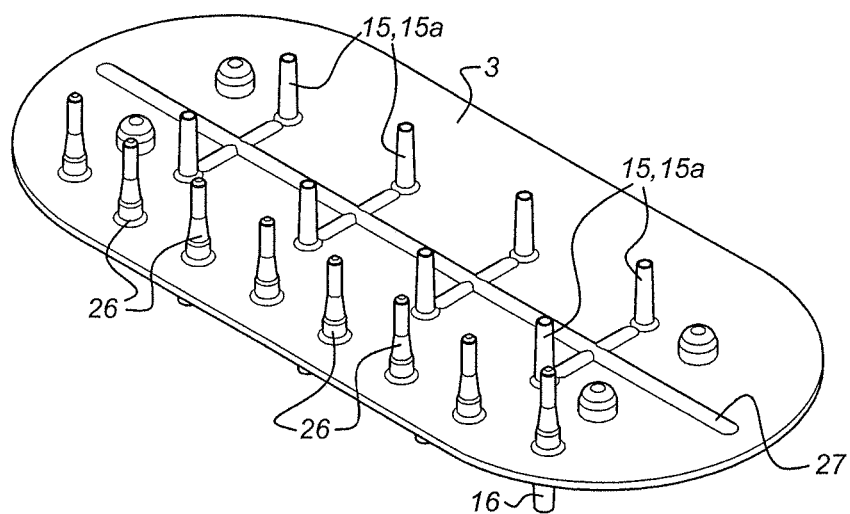
FIG. 4 shows a perspective view of the cover of the milking device.
Figure 4B:
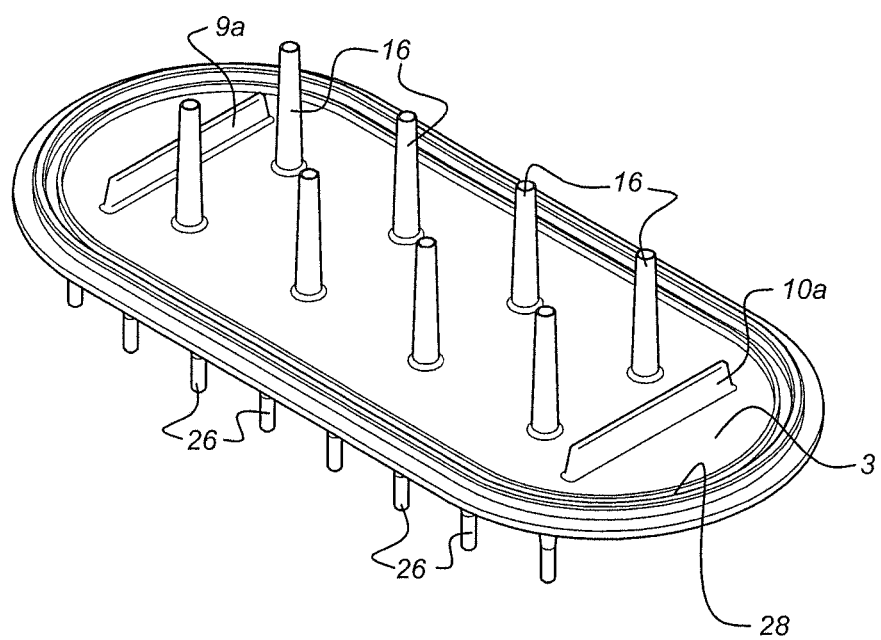

FIGS. 4A and 4B show a perspective view of an outer and an inner surface respectively, of the cover plate of the milking device.

FIG. 4A shows the outer surface of the over plate 3. The outer surface of the cover plate 3 comprises outward extensions 15A of the conduits 15. Each outward extension 15A can be connected to a flexible tube 38 (not shown) of which a distal end can be equipped with a teat cup.

The outward extensions are arranged in two rows along the longitudinal center line of the cover plate 3 so as to coincide with the positions of the tubings 12 of the partition wall 11. Further, in an embodiment, the outer surface comprises a series of posts 26, which are each shaped to receive the opening of a teat cup. Each post 26 can serve as a support for a teat cup, when not in use. This helps seal the teat cup and avoid air being sucked into the milk chamber when not all nipples of the rabbit are used to milk. In an embodiment, the posts 26 are arranged along a longitudinal side of the cover plate 3.

In an embodiment, a rib 27 is positioned in a center portion on the outer surface of the cover plate 3. Such a rib provides an increase in mechanical strength of the cover plate 3, when during use, a vacuum is created within the milking device. This rib is present at this position to simplify production as a feed channel for the plastic material. This rib has no technical impact on the milking of animals or a functioning of the device while milking.

FIG. 4B shows the inner surface of the cover plate 3, that faces towards the collecting chamber 4. The cover plate 3 is equipped with the conduits 15 that extend perpendicular from the surface of the cover plate. Further, the cover plate 3 comprises on its inner surface the edge 9A and the second edge 10A. The first edge 9A is arranged at a location between the first passage 9 in the first internal wall 7 and the collecting chamber in the vessel 2. The second edge 10A is arranged at a location between the second passage 10 in the second internal wall 8 and the collecting chamber 4.

A perimeter surface of an edge of the inner surface of the cover plate 3 is arranged with a secondary widened contacting surface 28 for connection with the contacting surface 22 of the vessel 2. The secondary widened contacting surface 28 may have a profile which mates with the profile on the perimeter surface of the vessel 2.

In an embodiment, the conduits 15 are integral with the cover plate. Advantageously, such a construction can be obtained by injection moulding of the cover plate and the conduits 15 (and the corresponding extensions 15A) as an integral workpiece.

Alternatively, the conduits 15 and the corresponding extensions 15A are formed separately from the cover plate 3 and are fixed to the cover plate. Similarly, the posts 26 can be either integral with the cover plate or fixed to the cover plate.

FIGS. 5A and 5B show a perspective view and a cross-sectional view, respectively, of a teat cup of the milking device.

A teat cup 30 for use with the milking device 1, is a tube 36, 37 which comprises a proximal portion 30, a center portion 32 and a distal portion 33.

The proximal portion is, in use, closest to the lactating rabbit and has an opening 34, which is arranged to accept the teat of a lactating rabbit.

The proximal portion has a rounded surface so as to avoid injury to the rabbit.

The distal portion of the teat cup is arranged for connection through the flexible tube 38 (not shown) to the milking device of the present invention. The distal portion may be tapered for simplifying the connection with the flexible tube.

FIG. 5B shows a lengthwise cross-section of the teat cup. In the proximal portion 31, the teat cup has a widened tube portion 36 with, at a location in the center portion, a transition to a tube portion 37 with a smaller diameter. The transition is arranged in such a way that the teat cup can be removably attached to one of the posts 26 on the cover plate 3.

In an embodiment, the internal diameter of the widened tube 36 is about 5 mm, and the smaller diameter tube 37 has a diameter of about 3 mm. The depth of the widened tube portion is about 12 mm, while the total length of the teat cup is about 33 mm.

Typically, the teat cup 30 is injection moulded from a plastic such as polypropylene. Advantageously, injection moulding allows to provide smooth surfaces without irregularities such as burrs that could injure the rabbit.

FIG. 6 shows a perspective view of the milking device in an assembled state.

For reason of clarity, FIG. 6 shows only one teat cup 30 that is connected by a respective flexible tube 38 to one of the conduits (15) of the cover plate.

Figure 7:
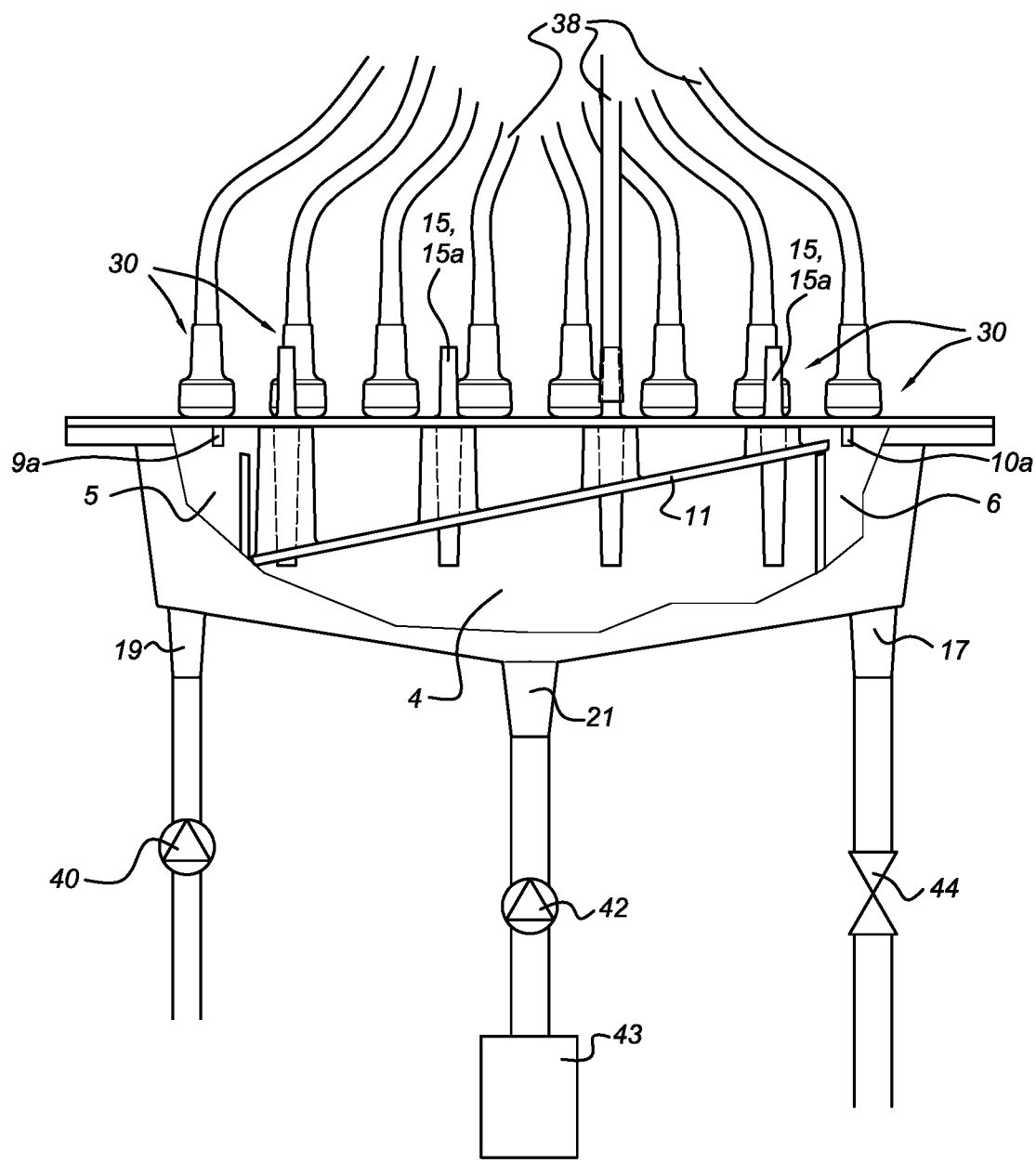
FIG. 7 schematically shows an installation comprising the milking device according to the invention.

FIG. 7 schematically shows an installation comprising the milking device according to the invention.

The installation comprises the milking device according to the invention, a vacuum pump 40, a roller pump 42 and an air inlet device 44. Further, the installation comprises a number of teat cups each connected by a flexible tube 38 to one of the conduits 15 of the cover plate 3. For use with rabbits, the number of teat cups connected to the milking device is typically eight.

An inlet of the vacuum pump 40 is connected over a conduit with the vacuum outlet 19 of the vacuum chamber 5. An inlet of the roller pump 42 which may be a displacement pump or peristaltic pump, is connected over a conduit with the outlet 21 of the collecting chamber 4. The roller pump is configured to pump milk from the collecting chamber to a milk container 43. Advantageously, the roller pump allows to close off the low pressure in the milking device from the outer pressure in the milk container.

The air inlet valve 44 is connected to the air inlet 17 of the air inlet chamber 6. In an embodiment, the air inlet valve 44 is configured to provide an, in alternation, opened and closed aperture for inlet of air or a gas such as nitrogen, into the air inlet chamber 6. In this manner, a pulsating pressure can be generated in the milking device. Such a pulsation facilitates the secretion of milk from the lactating animal.

According to an aspect of the invention, the milking device is manufactured from plastic.

In an embodiment, the vessel 2, the cover plate 3 and the partition wall 11 are each manufactured by means of injection moulding.

A very suitable plastic for this purpose is polypropylene or polyethylene. In a further embodiment for medical applications, a high grade polypropylene or polyethylene is used as plastic material compatible with medical hygiene practice. In a further embodiment, the milking device is embodied as a disposable.

The manufacturing further comprises that the partition wall 11 is inserted into the collecting chamber 4 of the vessel 2. The cover plate 3 is positioned on the vessel 2 in such a way that the widened contacting surface 22 of the vessel 2 contacts the secondary widened contacting surface 28 of the cover plate 3.

Subsequently, the widened contacting surface 22 of the vessel 2 and the secondary widened contacting surface 28 of the cover plate 3 are sealed together by a welding technique. Such a welding technique may comprise friction welding.

According to an aspect of the invention, the milking device as described above, is designed for use of milking animal species of the order Lagomorpha, in particular rabbits and/or hares, more in particular genetically engineered rabbits. The milking device as outlined herein is especially suited for milking rabbits. However, the person skilled in the art will appreciate that the technical aspects of the claimed device and its use can be extended to other (larger or smaller) animals, generally by adjusting its size and dimensions and number of in- and outlets, the applied synthetic material and form.

The invention claimed is:

1. A milking device comprising a vessel and a cover plate; the vessel and the cover plate forming a sealed volume; the sealed volume being internally divided into a collecting chamber, a vacuum chamber and an air intake chamber; the collecting chamber being arranged between the vacuum chamber and the air intake chamber; the vessel having a first internal wall that separates the collecting chamber from the air intake chamber, a first passage between the collecting chamber and the air intake chamber being arranged at the first internal wall; and the vessel having a second internal wall that separates the collecting chamber from the vacuum chamber, a second passage between the collecting chamber and the vacuum chamber being arranged at the second internal wall, wherein the milking device comprises a partition wall which extends from a top portion of the second internal wall at a side of the vacuum chamber to a bottom portion of the first internal wall at a side of the air intake chamber and which separates the collecting chamber into a lower collecting chamber portion and an upper collecting chamber portion, wherein the cover plate comprises a plurality of conduits which protrude from an outer surface of the cover plate and extend through the cover plate into the collecting chamber; an outlet portion of each of the conduits being adjacent to a bottom surface of the collecting chamber; and wherein the partition wall comprises a plurality of openings on which tubings are arranged, a number of tubings corresponds to a number of conduits; the tubings extending from the partition wall to the cover plate in such a way that each of the openings and each of the tubings of the partition wall is arranged with an internal diameter and in a position on the partition wall to allow passage of a corresponding conduit of the cover plate through the partition wall into the lower collecting chamber portion.

2. The milking device according to claim 1, wherein the first passage is arranged between the first internal wall and an internal surface of the cover plate, and the second passage is arranged between the second internal wall and the internal surface of the cover plate.

3. The milking device according to claim 1, wherein a perimeter surface of an upper edge of the vessel is arranged with a widened contacting surface and the cover plate is arranged with a secondary widened contacting surface in such a way that the widened contacting surface of the vessel contacts the secondary widened contacting surface of the cover plate.

4. The milking device according to claim 1, wherein the outer surface of the cover plate comprises outward extensions of the conduits, arranged for connection to a flexible tube of which a distal end can be equipped with a teat cup.

5. The milking device according to claim 4, wherein the outer surface of the cover plate comprises a series of posts that are each shaped to receive an opening of the teat cup, each of the posts serving as a support for the teat cup.

6. The milking device according to claim 1, wherein the cover plate comprises on an inner surface a first edge and a second edge, the first edge being arranged at a location between the first passage in the first internal wall and the collecting chamber, the second edge being arranged at a location corresponding between the second passage in the second internal wall and the collecting chamber.

7. The milking device according to claim 1, wherein the collecting chamber has an outlet for fluid, the air intake chamber has an air inlet, and the vacuum chamber has an vacuum outlet.

8. The milking device according to claim 1, wherein any one of the vessel, the cover plate, and partition wall is manufactured from a plastic.

9. A milking installation comprising a milking device comprising a vessel and a cover plate; the vessel and the cover plate forming a sealed volume; the sealed volume being internally divided into a collecting chamber, a vacuum chamber and an air intake chamber; the collecting chamber being arranged between the vacuum chamber and the air intake chamber; the vessel having a first internal wall that separates the collecting chamber from the air intake chamber, a first passage between the collecting chamber and the air intake chamber being arranged at the first internal wall; and the vessel having a second internal wall that separates the collecting chamber from the vacuum chamber, a second passage between the collecting chamber and the vacuum chamber being arranged at the second internal wall, wherein the milking device comprises a partition wall which extends from a top portion of the second internal wall at a side of the vacuum chamber to a bottom portion of the first internal wall at a side of the air intake chamber and which separates the collecting chamber into a lower collecting chamber portion and an upper collecting chamber portion, wherein the cover plate comprises a plurality of conduits which protrude from an outer surface of the cover plate and extend through the cover plate into the collecting chamber; an outlet portion of each of the conduits being adjacent to a bottom surface of the collecting chamber; and wherein the partition wall comprises a plurality of openings on which tubings are arranged, a number of tubings corresponds to a number of conduits; the tubings extending from the partition wall to the cover plate in such a way that each of the openings and each of the tubings of the partition wall is arranged with an internal diameter and in a position on the partition wall to allow passage of a corresponding conduit of the cover plate through the partition wall into the lower collecting chamber portion;

wherein the collecting chamber has an outlet for fluid, the air intake chamber has an air inlet, and the vacuum chamber has an vacuum outlet;

and the milking installation comprises a vacuum pump, a roller pump and an air inlet device, an inlet of the vacuum pump being connected over a conduit with the vacuum outlet of the vacuum chamber, an inlet of the roller pump being connected over a conduit with the outlet for fluid of the collecting chamber, a valve of the air inlet device being connected to the air inlet of the air intake chamber.

10. The milking installation according to claim 9, wherein an outlet of the roller pump is in fluid communication with a container for collecting fluid from the collecting chamber.

11. The milking installation according to claim 9, wherein the valve of the air inlet device is configured to provide, in alternation, an opened and closed aperture for letting in air or a gas into the air inlet chamber.

12. The milking installation according to claims 9, further comprising a number of teat cups each connected by a respective flexible tube to one of the plurality of conduits of the cover plate.

13. A method of manufacturing a milking device comprising a vessel and a cover plate;

the vessel and the cover plate forming a sealed volume; the sealed volume being internally divided into a collecting chamber, a vacuum chamber and an air intake chamber; the collecting chamber being arranged between the vacuum chamber and the air intake chamber;

the vessel having a first internal wall that separates the collecting chamber from the air intake chamber, a first passage between the collecting chamber and the air intake chamber being arranged at the first internal wall; and the vessel having a second internal wall that separates the collecting chamber from the vacuum chamber, a second passage between the collecting chamber and the vacuum chamber being arranged at the second internal wall, wherein the milking device further comprises a partition wall which extends from a top portion of the second internal wall at a side of the vacuum chamber to a bottom portion of the first internal wall at a side of the air intake chamber and which separates the collecting chamber into a lower collecting chamber portion and an upper collecting chamber portion, wherein the cover plate comprises a plurality of conduits which protrude from an outer surface of the cover plate and extend through the cover plate into the collecting chamber; an outlet portion of each of the conduits being adjacent to a bottom surface of the collecting chamber; and wherein the partition wall comprises a plurality of openings on which tubings are arranged, a number of tubings corresponds to a number of conduits; the tubings extending from the partition wall to the cover plate in such a way that each of the openings and each of the tubings of the partition wall is arranged with an internal diameter and in a position on the partition wall to allow passage of a corresponding conduit of the cover plate through the partition wall into the lower collecting chamber portion, the method comprising:

casting or injection moulding of the vessel, the cover plate and the partition wall from a plastic.

14. The method according to claim 13, wherein the milking device further comprises a perimeter surface of an upper edge of the vessel arranged with a widened contacting surface and the cover plate is arranged with a secondary widened contacting surface, wherein the method comprises:

inserting the partition wall into the collecting chamber of the vessel; positioning the cover plate on the vessel in such a way that the widened contacting surface of the vessel contacts the secondary widened contacting surface of the cover plate.

15. The method according to claim 14, wherein the widened contacting surface of the vessel and the secondary widened contacting surface of the cover plate are sealed together by a welding technique.

16. A method of milking comprising milking animal species of the order Lagomorpha using of a milking device comprising a vessel and a cover plate; the vessel and the cover plate forming a sealed volume; the sealed volume being internally divided into a collecting chamber, a vacuum chamber and an air intake chamber; the collecting chamber being arranged between the vacuum chamber and the air intake chamber; the vessel having a first internal wall that separates the collecting chamber from the air intake chamber, a first passage between the collecting chamber and the air intake chamber being arranged at the first internal wall; and the vessel having a second internal wall that separates the collecting chamber from the vacuum chamber, a second passage between the collecting chamber and the vacuum chamber being arranged at the second internal wall, wherein the milking device comprises a partition wall which extends from a top portion of the second internal wall at a side of the vacuum chamber to a bottom portion of the first internal wall at a side of the air intake chamber and which separates the collecting chamber into a lower collecting chamber portion and an upper collecting chamber portion, wherein the cover plate comprises a plurality of conduits which protrude from an outer surface of the cover plate and extend through the cover plate into the collecting chamber; an outlet portion of each of the conduits being adjacent to a bottom surface of the collecting chamber; and wherein the partition wall comprises a plurality of openings on which tubings are arranged, a number of tubings corresponds to a number of conduits; the tubings extending from the partition wall to the cover plate in such a way that each of the openings and each of the tubings of the partition wall is arranged with an internal diameter and in a position on the partition wall to allow passage of a corresponding conduit of the cover plate through the partition wall into the lower collecting chamber portion.

17. The method of claim 16, further comprising obtaining a protein from milk produced by the milking.

\* \* \* \* \*